(12) United States Patent
Greco et al.

(10) Patent No.: US 12,105,251 B2
(45) Date of Patent: Oct. 1, 2024

(54) METALENS PORTION, ELECTRONIC DEVICE AND METHOD

(71) Applicant: Sony Group Corporation, Tokyo (JP)

(72) Inventors: Tonino Greco, Stuttgart (DE); Klaus Zimmermann, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 538 days.

(21) Appl. No.: 17/431,439

(22) PCT Filed: Mar. 24, 2020

(86) PCT No.: PCT/EP2020/058226
§ 371 (c)(1),
(2) Date: Aug. 17, 2021

(87) PCT Pub. No.: WO2020/200931
PCT Pub. Date: Oct. 8, 2020

(65) Prior Publication Data
US 2022/0137259 A1 May 5, 2022

(30) Foreign Application Priority Data
Mar. 29, 2019 (EP) .................................... 19166120

(51) Int. Cl.
*G02B 1/00* (2006.01)
*G02B 3/00* (2006.01)
(52) U.S. Cl.
CPC ........... *G02B 1/002* (2013.01); *G02B 3/0087* (2013.01); *G02B 2207/101* (2013.01)

(58) Field of Classification Search
CPC .................. G02B 1/002; G02B 3/0087; G02B 2207/101; G02B 1/005
USPC .......................................................... 359/642
See application file for complete search history.

(56) References Cited

U.S. PATENT DOCUMENTS

| | | | | |
|---|---|---|---|---|
| 10,324,314 | B2* | 6/2019 | Czaplewski | .......... G02F 1/0102 |
| 10,527,851 | B2* | 1/2020 | Lin | ........................ H04N 13/344 |
| 10,795,168 | B2* | 10/2020 | Riley, Jr. | ................ G02B 27/12 |
| 10,976,472 | B2* | 4/2021 | Lee | ........................ G02B 1/002 |
| 11,206,978 | B2* | 12/2021 | Hu | ........................ G02B 1/002 |
| 11,366,296 | B2* | 6/2022 | Devlin | ...................... G03F 7/40 |

(Continued)

FOREIGN PATENT DOCUMENTS

| | | |
|---|---|---|
| CN | 101320686 A | 12/2008 |
| CN | 101506760 A | 8/2009 |

(Continued)

OTHER PUBLICATIONS

International Search Report and Written Opinion mailed on Jun. 26, 2020, received for PCT Application PCT/EP2020/058226, Filed on Mar. 24, 2020, 10 pages.

(Continued)

*Primary Examiner* — William R Alexander
(74) *Attorney, Agent, or Firm* — XSENSUS LLP

(57) ABSTRACT

The disclosure generally pertains to a metalens portion comprising a plurality of holes in a first substrate, wherein at least two holes of the plurality of holes differ in size, and wherein a refractive index of the metalens portion is defined by at least one of shape of the holes and an arrangement pattern of the holes, thereby providing a metalens.

19 Claims, 3 Drawing Sheets

(56) References Cited

U.S. PATENT DOCUMENTS

| | | | |
|---|---|---|---|
| 2014/0057072 A1* | 2/2014 | Liu .................... | H01Q 15/006 |
| | | | 264/109 |
| 2014/0085693 A1 | 3/2014 | Mosallaei | |
| 2014/0263982 A1 | 9/2014 | Shkunov et al. | |
| 2016/0126381 A1* | 5/2016 | Wang .................... | H01L 31/107 |
| | | | 257/429 |
| 2017/0322418 A1 | 11/2017 | Lin et al. | |
| 2018/0224574 A1 | 8/2018 | Lee | |
| 2018/0341090 A1 | 11/2018 | Devlin et al. | |
| 2018/0341124 A1* | 11/2018 | Czaplewski .......... | G02F 1/0072 |
| 2019/0025463 A1* | 1/2019 | She .................... | G02B 27/4211 |
| 2019/0044003 A1 | 2/2019 | Heck et al. | |
| 2019/0064532 A1* | 2/2019 | Riley, Jr. ................ | G02B 6/428 |
| 2019/0154877 A1* | 5/2019 | Capasso ................ | G02B 1/002 |
| 2021/0307608 A1* | 10/2021 | Hu ........................ | A61B 3/12 |

FOREIGN PATENT DOCUMENTS

| | | |
|---|---|---|
| CN | 108988106 A | 12/2018 |
| JP | 2004-61905 A | 2/2004 |
| WO | 2017/176921 A1 | 10/2017 |
| WO | 2018/208964 A1 | 11/2018 |

OTHER PUBLICATIONS

Arbabi et al., "Miniature Optical Planar Camera Based on a Wide-Angle Metasurface Doublet Corrected for Monochromatic Aberrations", Nature Communications, Nov. 28, 2016, pp. 1-9.

Wathuthanthri et al., "Simple Holographic Patterning for High-Aspect-Ratio Three-Dimensional Nanostructures with Large Coverage Area", Advanced Functional Materials, vol. 23, pp. 608-618.

Khorasaninejad et al., "Planar Lenses at Visible Wavelengths", Physics Optics, May 7, 2016. 17 pages.

Nazmi Yilmaz et al., "Nanohole-based phase gradient metasurfaces for light manipulation", Journal of Physics D: Applied Physics, 20190314, pp. 205102-1-205102-5, vol. 52.

* cited by examiner

METALENS PORTION, ELECTRONIC DEVICE AND METHOD

CROSS-REFERENCE TO RELATED APPLICATIONS

The present application is based on PCT filing PCT/EP2020/058226, filed Mar. 24, 2020, which claims the priority of European patent application no. EP 19166120.6, filed Mar. 29, 2019, the contents of each are hereby incorporated by reference.

TECHNICAL FIELD

The present disclosure generally pertains to a metalens portion, an electronic device and a method.

TECHNICAL BACKGROUND

Metasurfaces have attracted interest in recent years, since may enable precise control of optical wavefronts and are easy to fabricate with conventional microfabrication technology in a flat, thin, and light weight form factor. Various conventional devices such as gratings and lenses have been demonstrated using metasurfaces. These optical elements are typically composed of large numbers of scatterers, or meta-atoms placed on a two-dimensional lattice to locally shape optical wavefronts. A metalens design is basically a nanostructure applied to a substrate that allows controlling the wavefront to derive the lens function.

Generally, metalenses are known and used for providing a (micro)lens on, e.g., image sensors. Metalenses may include refractive indexes which are smaller than one and they may be based on a plurality of nanopillars which are imprinted on a substrate. The nanopillars may include $TiO_2$ is material with an exemplary pillar diameter ranging from 50 to 340 nm and a pillar height of 600 nm. However, due to the structure of the nanopillars (small and thin), known metalenses typically may have a low mechanical stability.

Although there exist techniques for manufacturing metalenses, it is generally desirable to provide a metalens portion, an electronic device and a method, e.g., for providing metalenses with a high mechanical stability.

SUMMARY

According to a first aspect the disclosure provides a metalens portion comprising a plurality of holes in a first substrate, wherein at least two holes of the plurality of holes differ in size, and wherein a refractive index of the metalens portion is defined by at least one of shape of the holes and an arrangement pattern of the holes, thereby providing a metalens.

According to a second aspect the disclosure provides an electronic device, comprising a second substrate; and a metalens portion including a plurality of holes in a substrate, wherein at least two holes of the plurality of holes differ in size, and wherein a refractive index of the metalens portion is defined by at least one of shape of the holes and an arrangement pattern of the holes, thereby providing a metalens.

According to a third aspect the disclosure provides a method for manufacturing a metalens portion, comprising: providing a plurality of holes in a first substrate, wherein at least two holes of the plurality of holes differ in size, and wherein a refractive index of the metalens portion is defined by at least one of shape of the holes and an arrangement pattern of the holes, thereby providing a metalens function.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
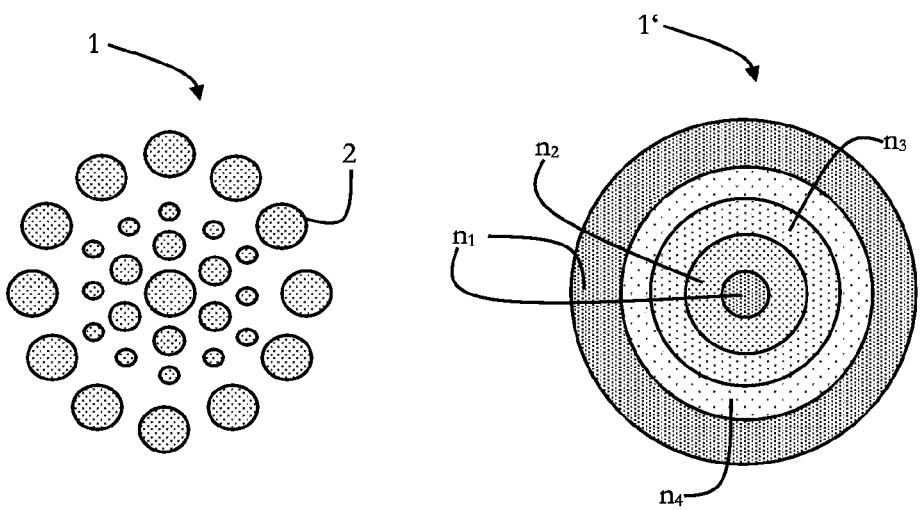
FIG. 1 shows a metalens as it is generally known.

Before a detailed description of the embodiments under reference of FIG. 1 is given, general explanations are made.

As mentioned in the outset, metalenses are generally known. It has been recognized that known metalenses have a low mechanical stability.

Therefore, some embodiments pertain to a metalens portion including a plurality of holes in a first substrate, wherein at least two holes of the plurality of holes differ in size, and wherein a refractive index of the metalens portion is defined by at least one of shape of the holes and an arrangement pattern of the holes, thereby providing a metalens.

As mentioned, a metalens may include a structured arrangement on a nanometer or micrometer scale (which may also be referred to as meta-material) and the metalens may have a refractive index, due to their structure, which is smaller than one. In principle, the metalens may provide a lens function, as generally known. In more detail, in some embodiments, metasurfaces, which may be used for providing a metalens function, are typically thin optical components that rely on a different approach for light control: A dense arrangement of subwavelength resonators is designed to modify the optical response of the interface. The resonant nature of the scatterers introduces an abrupt phase shift in the incident wavefront, making it possible to mold the scattered wavefront at will and enabling a new class of planar photonics components-flat optics. The metasurface approach may be distinct in that it provides continuous control of the phase profile (i.e., from 0 to $2\pi$) with a binary structure (only two levels of thickness), circumventing the fundamental limitation of multiple diffraction orders while maintaining the size, weight, and ease-of-fabrication advantages of planar diffractive optics. However, metasurface-based optical devices demonstrated so far may be affected by chromatic aberrations, but research efforts have also shown that relatively broadband optical metasurfaces can be achieved.

The metalens portion may provide a lens function of an optical device, wherein the lens function is achieved by a nanostructuring or a microstructuring of a substrate material, which is suitable to transmit light of specific wavelengths (e.g. red, green, infrared, 430 nm) or a range of wavelengths (e.g. visible light, microwaves, 450 nm to 500 nm). The lens may transmit all the incident light (i.e. transmission of 100%), or only a fraction of the incident light (e.g. 50%).

The first substrate may include a metal, such as silicon, titanium, aluminum, or the like, which is known to be processed to have desired metalens properties (e.g. transmissibility of light, processable to be nano- or microstructured, and the like), for example by oxidation, nitration, arsenation, or the like.

The metalens portion may include a single metalens or a plurality of metalenses arranged side-by-side in order to enlarge a light incident area and/or arranged in series, as it is known from (common) lenses.

The plurality of holes may refer to any number of holes, which is suitable for providing a metalens function (e.g. 100 without limiting the present disclosure in that regard), wherein a hole refers to a through hole, a pit, a cavity, or the like, in the first substrate material, as described above. In this context, the nanostructuring or the microstructuring refers to providing the plurality of holes.

At least two holes may differ in size. In general, every hole may differ in size or at least one subset may have a first common size, whereas another subset may have a second common size, or the like.

A size may refer to at least one of shape of the holes, such as diameter, height, depth, geometry, or the like, and by providing different sizes of the holes, different optical properties may be locally achieved, such as a locally differing refractive index.

Also, the (locally differing) refractive index of the lens may be defined by an arrangement pattern of the plurality of holes, e.g. a ring like arrangement, circular arrangement, triangular arrangement, rectangular arrangement, or the like.

Thereby, lens errors, such as aberrations, distortions, or the like may be compensated for.

For example, the plurality of holes may be through holes which have a cylindrical shape and are arranged on concentric rings around a center of the metalens, wherein the radius of the holes is the same for the holes on each ring, but among the rings the radius may differ. Thereby each concentric ring has another refractive index.

In some embodiments, the first substrate includes an oxide, as described above, wherein the oxide may include at least one of titanium and aluminum, as described herein.

In some embodiments, the arrangement pattern includes concentric rings, as described herein.

In some embodiments, the shape of the holes is defined by at least one of height and diameter, as described herein. Moreover, depending on the geometry of the holes, the holes may have more than one height or diameter or other parameters may be used in order to characterize the holes, such as curvature, or the like.

In some embodiments, the metalens portion further includes a plurality of refractive indexes on the metalens portion, wherein the refractive indexes increase from a middle of the metalens portion to a predetermined distance from the middle of the metalens.

For example, the metalens portion may include three different refractive indexes, the first (smallest) refractive index in the middle, a second smallest refractive index on a first ring around the middle, a largest refractive index on a second ring around the middle, wherein the radius of the second ring is larger than the radius of the first ring. On a third ring with the largest radius, the first (smallest) refractive index may, however, be found again, since the holes have the same shape and size as in the middle.

Some embodiments pertain to an electronic device (e.g. an image sensor, camera, mobile phone, or any other type of electronic device), including a second substrate; and a metalens portion including a plurality of holes in a first substrate, wherein at least two holes of the plurality of holes differ in size, and wherein a refractive index of the metalens portion is defined by at least one of shape of the holes and an arrangement pattern of the holes, thereby providing a metalens, as described herein.

The second substrate may be another metalens portion, an optical device, such as an image sensor, or the like. The second substrate may be the same substrate as the first substrate, but in other embodiments, the second substrate is different from the first substrate.

In some embodiments, the second substrate and the metalens portion (which may each may also be a wafer) are mounted onto each other. The mounting may be achieved with known techniques, for example bonding between a device or substrate including the metalens portion and the second substrate, wherein the bonding may be one of the following: plasma activated bonding, direct bonding, adhesive bonding, anodic bonding, eutectic bonding, glass frit bonding, thermocompression bonding, transient liquid phase diffusion bonding, surface activated bonding, or the like.

In some embodiments, the electronic device includes circuitry configured to process a photoelectric signal generated in the electronic device, such as a photodiode, an photoconversion unit, transistors, floating diffusions, and the like, suitable for processing a signal which may be generated in response to light, which is transmitted through the transparent optical portion. Thereby, a function of an imaging device or a part of an imaging device may be achieved.

In some embodiments, the second substrate is a semiconductor substrate, such as silicon, silicon compounds, or other semiconductor substrates known in the art, whereby known methods may be utilized, wherein the circuitry may be formed on the second substrate, such that the first substrate (metalens portion) and the second substrate may be manufactured independently from each other.

Some embodiments pertain to a method for manufacturing a metalens portion, comprising: providing a plurality of holes in a first substrate, wherein at least two holes of the plurality of holes differ in size, and wherein a refractive index of the metalens portion is defined by at least one of shape of the holes and an arrangement pattern of the holes, thereby providing a metalens function, as described herein.

In some embodiments the providing of the plurality of holes includes a molding of the plurality of holes, wherein the plurality of holes are molded in a mold.

The molding may be performed by any known molding technique, such as casting, cold deformation, hot deformation, spray cast, injection molding, or the like. The mold may be a negative of the metalens portion, wherein the first substrate may be casted around a plurality of protrusions (e.g. nanopillars), or the like.

Therefore, in some embodiments the mold includes a plurality of protrusions and the plurality of holes is molded based on the plurality of protrusions. Thereby, known techniques of providing nanopillars may be the basis of the mold.

The providing of the plurality of holes may further be based on chemical etching methods, nanopore generation, electrochemical anodization, and the like.

Hence, some embodiments, provide the same wavefront construction efficiency as in "normal" pillar based metasurfaces, discussed above, the mechanical stability may be improved due to a continuous material surface, which is only interrupted by wholes, and/or the fabrication by photolithography and chemical etching methods may reduce costs and manufacturing complexity, since such methods are well-established.

Returning to FIG. 1, there is shown a metalens 1, as it is generally known. The metalens 1 includes a plurality of nanopillars 2 including titanium oxide. The nanopillars 2 differ in their sizes, thereby providing different refractive indexes on the metalens, as it is shown in another representation 1' of the metalens 1. The metalens 1' depicts the distribution of refractive indexes $n_1$, $n_2$, $n_3$, $n_4$, wherein the refractive indexes are based on the size of the corresponding nanopillars, such that the refractive index $n_1$ is found in the middle of the metalens and on the outer ring of the metalens. Moreover, in the metalens 1', the refractive index becomes smaller from the middle of the lens to the outside (except for the outer ring), which is depicted with a corresponding density of the respective hachures of the rings, i.e. $n_1 > n_2 > n_3 > n_4$. Furthermore, the refractive index of air is bigger than $n_1$.

Figure 2:
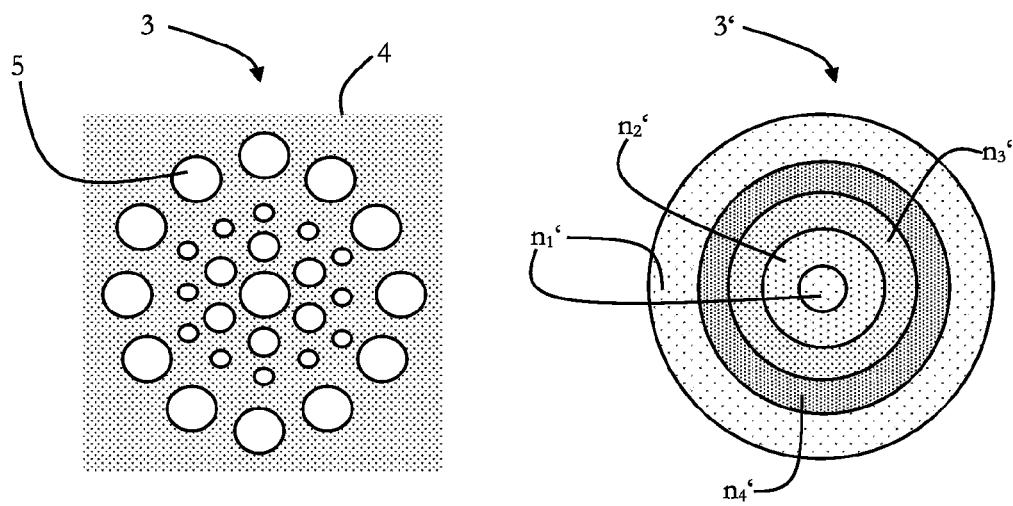
FIG. 2 shows a metalens according to the present disclosure.

FIG. 2 depicts a metalens 3 according to an embodiment of the present disclosure. The metalens includes a substrate 4 including titanium oxide and a plurality of through holes, which are manufactured with electrochemical anodization. The substrate has a thickness of 600 nanometers. Moreover, the through holes differ in their respective sizes, thereby providing different refractive indexes on the metalens, as it is shown in the representation 3' of the metalens 3. The metalens 3' depicts a distribution of refractive indexes $n_1'$, $n_2'$, $n_3'$, $n_4'$, similar to the distribution of refractive indexes of FIG. 1. However, the refractive indexes become larger from the middle to the outside, with exception of the outer ring, i.e. $n_1' < n_2' < n_3' < n_4'$.

Figure 3:
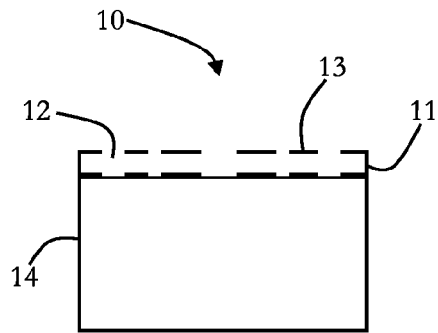
FIG. 3 shows an electronic device according to the present disclosure.

FIG. 3 shows a cross section of an electronic device 10 according to the present disclosure. The electronic device 10 includes a metalens portion 11, which in turn includes a plurality of holes 12 through a first substrate 13 including titanium oxide.

The metalens portion 11 is mounted to a semiconductor device 14 (second substrate), as it is generally known, including silicon and further including circuitry (not depicted) to process a photoelectric signal. The mounting may involve a bonding process, for example, between a device including the metalens portion 11 and the semiconductor device.

Figure 4:
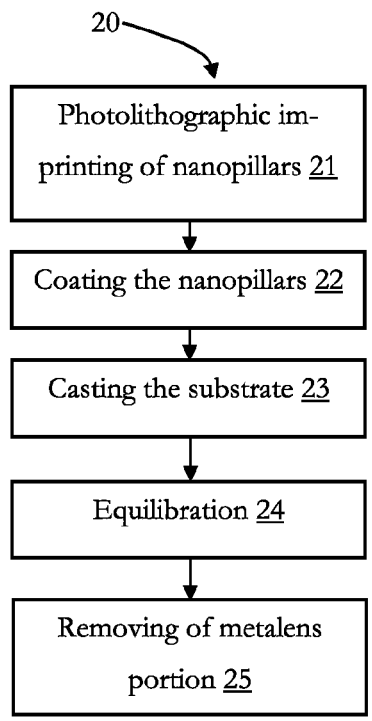
FIG. 4 shows a method according to the present disclosure.

FIG. 4 shows a method 20 for providing a plurality of holes for the production of a metalens portion according to the present disclosure.

In 21, a mold is formed by a photolithographic imprinting of nanopillars, as it is generally known.

In 22, the imprinted nanopillars are coated in order to have a low adhesion with the substrate, which is casted on the mold in 23. In this embodiment, the substrate includes titanium oxide, wherein the substrate is melted before it is casted.

In 24, the substrate is equilibrated, i.e. in this case, cooled down, such that it is in a state where it can be removed from the mold.

In 25, the substrate is removed and thereby the metalens is provided.

Figure 5:
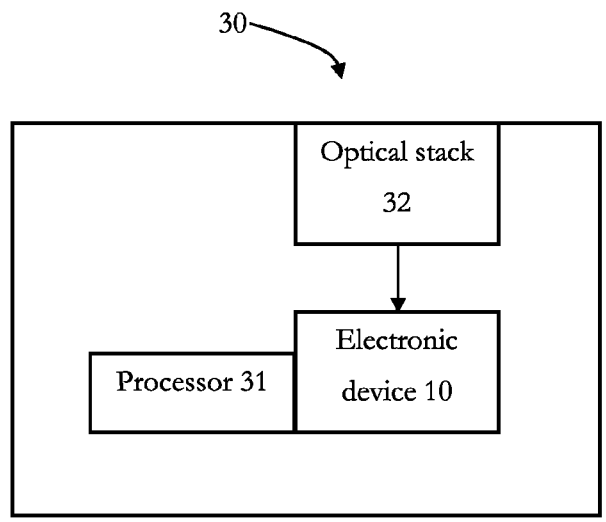
FIG. 5 shows a camera device according to the present disclosure.

FIG. 5 shows a camera device 30 according to the present disclosure including the electronic device 10 of FIG. 3, a processor 31 (circuitry) to process a photoelectric signal generated in the electronic device, and an optical stack to focus light which is then transmitted to the electronic device 10. The camera device 30 may further include other parts, such as a flash, a display, or the like, which may be apparent to a person skilled in the art.

Figure 6:
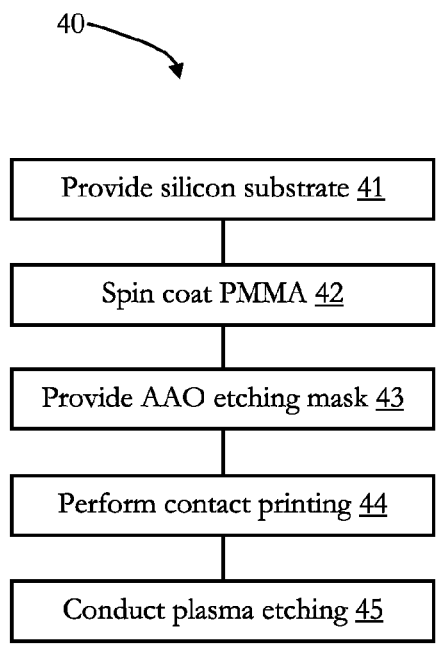
FIG. 6 is flowchart of a method for providing a plurality of holes as nanopores.

FIG. 6 is a flowchart of another method 40 for providing a plurality of holes for the production of a metalens portion, wherein the plurality of holes are formed as nanopores.

At 41, a silicon substrate is provided.

At 42, poly(methylmethacrylate) (PMMA) is spin-coated on the silicon (Si) substrate.

At 43, an anodic aluminum oxide (AAO) membrane is provided as an etching mask on the PMMA layer. The etching mask is such configured that it includes the pattern of the to be formed plurality of holes.

At 44, a contact printing is performed for providing a conformal contact of the AAO membrane mask to the Si substrate.

At 45, a $CF_4$ plasma etching is conducted for transferring nanopores onto the SI substrate through the PMMA layer, thereby generating the nanopores.

It should be recognized that the embodiments describe methods with an exemplary ordering of method steps. The specific ordering of method steps is however given for illustrative purposes only and should not be construed as binding. For example the ordering of 21 and 22 in the embodiment of FIG. 4 may be exchanged. Other changes of the ordering of method steps may be apparent to the skilled person.

Please note that the division of the camera device 30 into units 10, 31 and 32 is only made for illustration purposes and that the present disclosure is not limited to any specific division of functions in specific units. For instance, the camera device 30 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

Note that the present technology can also be configured as described below.

(1) A metalens portion comprising a plurality of holes in a first substrate, wherein
at least two holes of the plurality of holes differ in size, and wherein
a refractive index of the metalens portion is defined by at least one of shape of the holes and an arrangement pattern of the holes, thereby providing a metalens.

(2) The metalens portion of (1), wherein the first substrate includes an oxide.

(3) The metalens portion of anyone of (1) or (2), wherein the oxide includes at least one of titanium and aluminum.

(4) The metalens portion of anyone of (1) to (3), wherein the arrangement pattern includes concentric rings.

(5) The metalens portion of anyone of (1) to (4), wherein the shape of the holes is defined by at least one of height and diameter.

(6) The metalens portion of anyone of (1) to (5), further comprising a plurality of refractive indexes on the metalens portion, wherein the refractive indexes increase from a middle of the metalens portion to a predetermined distance from the middle of the metalense.

(7) An electronic device, comprising:
a second substrate; and
a metalens portion including a plurality of holes in a substrate, wherein at least two holes of the plurality of holes differ in size, and wherein a refractive index of the metalens portion is defined by at least one of shape of the holes and an arrangement pattern of the holes, thereby providing a metalens.

(8) The electronic device of (7), wherein the second substrate and the metalens portion are mounted onto each other.

(9) The electronic device of anyone of (7) or (8), further comprising circuitry configured to process a photoelectric signal generated in the electronic device.

(10) The electronic device of anyone of (7) to (9), wherein the second substrate is a semiconductor substrate.

(11) The electronic device of anyone of (7) to (10), wherein the second substrate includes silicon.

(12) A method for manufacturing a metalens portion, comprising:
providing a plurality of holes in a first substrate, wherein at least two holes of the plurality of holes differ in size, and wherein a refractive index of the metalens portion is defined by at least one of shape of the holes and an arrangement pattern of the holes, thereby providing a metalens function.

(13) The method of (12), wherein the providing of the plurality of holes includes a molding of the plurality of holes, wherein the plurality of holes are molded in a mold.

(14) The method of anyone of (12) or (13), wherein molding includes casting of the first substrate.

(15) The method of anyone of (12) to (14), wherein the mold includes a plurality of protrusions and the plurality of holes is molded based on the plurality of protrusions.

(16) The method of anyone of (12) to (15), wherein the providing of the plurality of holes includes a chemical etching of the holes.

(17) The method of anyone of (12) to (16), wherein the providing of the plurality of holes includes nanopore generation.

(18) The method of anyone of (12) to (17), wherein the providing of the plurality of holes includes electrochemical anodization.

The invention claimed is:

1. A metalens portion comprising:
a plurality of holes in a first substrate, wherein
at least two holes of the plurality of holes differ in size,
a plurality of refractive indexes of the metalens portion is defined by at least one of a shape of the plurality of holes and an arrangement pattern of the plurality of holes, thereby providing a metalens, and
the refractive indexes increase from an innermost refractive index of the metalens to an intermediate refractive index, the intermediate refractive index being immediately adjacent to an outermost refractive index of the metalens.

2. The metalens portion of claim 1, wherein the first substrate includes an oxide.

3. The metalens portion of claim 2, wherein the oxide includes at least one of titanium and aluminum.

4. The metalens portion of claim 1, wherein the arrangement pattern includes concentric rings.

5. The metalens portion of claim 4, wherein all holes in one of the concentric rings have a same radius.

6. The metalens portion of claim 1, wherein the refractive indexes increase continuously from the innermost refractive index of the metalens to the intermediate refractive index.

7. The metalens portion of claim 1, wherein the shape of the plurality of holes is defined by at least one of height and diameter.

8. An electronic device, comprising:
a second substrate; and
a metalens portion including a plurality of holes in a first substrate, wherein
at least two holes of the plurality of holes differ in size,
a plurality of refractive indexes of the metalens portion is defined by at least one of a shape of the plurality of holes and an arrangement pattern of the plurality of holes, thereby providing a metalens, and
the refractive indexes increase from an innermost refractive index of the metalens to an intermediate refractive index, the intermediate refractive index being immediately adjacent to an outermost refractive index of the metalens.

9. The electronic device of claim 8, wherein the second substrate and the metalens portion are mounted onto each other.

10. The electronic device of claim 8, further comprising circuitry configured to process a photoelectric signal generated in the electronic device.

11. The electronic device of claim 8, wherein the second substrate is a semiconductor substrate.

12. The electronic device of claim 11, wherein the second substrate includes silicon.

13. A method for manufacturing a metalens portion, comprising:
providing a plurality of holes in a first substrate, wherein
at least two holes of the plurality of holes differ in size,
a plurality of refractive indexes of the metalens portion is defined by at least one of a shape of the plurality of holes and an arrangement pattern of the plurality of holes, thereby providing a metalens function, and
the refractive indexes increase from an innermost refractive index of the metalens to an intermediate refractive index, the intermediate refractive index being immediately adjacent to an outermost refractive index of the metalens.

14. The method of claim 13, wherein
the providing of the plurality of holes includes a molding of the plurality of holes, and
the plurality of holes are molded in a mold.

15. The method of claim 14, wherein the molding includes casting of the first substrate.

16. The method of claim 14, wherein
the mold includes a plurality of protrusions, and
the plurality of holes is molded based on the plurality of protrusions.

17. The method of claim 13, wherein the providing of the plurality of holes includes a chemical etching of the holes.

18. The method of claim 13, wherein the providing of the plurality of holes includes nanopore generation.

19. The method of claim 13, wherein the providing of the plurality of holes includes electrochemical anodization.

* * * * *